Aug. 12, 1924.

L. H. BEEBE 1,504,857

VARIABLE SPEED TRANSMISSION

Filed Nov. 23, 1921    5 Sheets-Sheet 3

INVENTOR

Lucian H. Beebe

Patented Aug. 12, 1924.

1,504,857

UNITED STATES PATENT OFFICE.

LUCIAN H. BEEBE, OF NEW LONDON, CONNECTICUT.

VARIABLE-SPEED TRANSMISSION.

Application filed November 23, 1921. Serial No. 517,202.

*To all whom it may concern:*

Be it known that I, LUCIAN H. BEEBE, a citizen of the United States, and a resident of New London, in the county of New London and State of Connecticut, have invented a certain new and useful Variable-Speed Transmission, of which the following is a specification.

The invention relates to mechanism for transmitting power from power shaft to a driven shaft in the situation where the speed of the source of power cannot be varied to the extent desired, and wherein the speed of the driven shaft may be varied within wide limits relatively to the power shaft. The apparatus of the invention will be described in connection with a vehicle having an internal combustion power plant, but it is to be understood that the invention is not limited to such use, but may be used in connection with any type of mechanism where the source of power cannot itself be varied to the extent desired.

The objects of the invention are to provide a device of the character described, which will be easy of control; in which shocks will be eliminated; in which there will be no slippage; which will be positive in its action; which will be silent in its action; in which there are no gears to be meshed and unmeshed; in which the driven shaft will be always under control; which will be cheap to construct; which will not easily get out of order; and which is capable of easy repair.

These and further objects will more fully appear in the following specification and accompanying drawings considered together or separately.

One embodiment of the invention is illustrated in the accompanying drawings, in which like parts in all of the several figures are designated by corresponding characters of reference, and in which—

In the embodiment of the invention illustrated 1 designates a shaft, which may be the crank shaft of an internal combustion engine, and to which is rigidly secured a bevel gear 2. The gear 2 meshes with pairs of oppositely disposed bevel pinions 3 free to rotate on stud shafts in a spider 4, rigidly secured to a shaft 5 in axial alinement with the shaft 1, and the pinions are in mesh with a controlling bevel gear 6 secured to a tubular shaft 7 which acts as a bearing for the shaft 5 to which the spider 4 is secured. The above described mechanism is a well known form of differential gear. Carried on and rigidly secured to the tubular shaft 7 is a pinion 8, and a pinion 9 of somewhat greater diameter is secured to the shaft 5 which is the propeller shaft of the vehicle or other driven mechanism.

Extending parallel to the shaft 5 are two axially alined counter shafts 10 and 11. The shaft 10 carries a spur gear 12 which meshes with the pinion 8, and the shaft 11 is provided with a spur gear 13 in mesh with the pinion 9, whereby the said counter shafts are driven at different speeds and in opposite direction. The relative proportions of the pinion 8 and gear 12, and of the pinion 9 and gear 13 are such as to equalize the frequency of rotation of the shafts 10 and 11 at mid-speed for the particular proportion of differential gear employed.

In the embodiment of the invention illustrated, the gears 2 and 6 of the differential are double the diameter of the pinions 3, and there is a reduction of 4 to 1 between the pinion 8 and gear 12, and of 2 to 1 between the pinion 9 and gear 13. The shafts, 1, 5, 7, 10 and 11 are mounted in suitable bearings in a gear casing 14 which may be supported in any desired manner.

The counter shaft 10 carries at one end an eccentric journal 15 and at the opposite end an eccentric journal 16. The journals 15 and 16 are set at an angle 90° relatively to each other. The shaft 11 is similarly provided with eccentric journals 17 and 18 likewise positioned 90° apart.

Journalled on the shaft 10 and spaced apart are two depending link arms 19 and 20 each carrying at its lower, free extremity a pivoted link member 21 having a curved slot 22 therein. The arms 19 and 20 are disposed in proximity to the eccentric journals 15 and 16 respectively, and a rod 23 pivoted to a journal 15 or 16 extends downwardly and is pivoted to the member 21 at a point removed from the pivot of the arm 19 or 20.

Slidably mounted in the slot 22 of the link of the arm 19 is a block 24 to which is pivoted one extremity of a bell crank lever 25, and a similar lever 26 is likewise connected to the link of the arm 20.

The shaft 11 is provided with link arms 27 and 28 carrying links 29 connected to the eccentric portions thereof by means of rods 30, and the links of the said arms are slidably connected by means of blocks similar to 24 with bellcrank levers 31 and 32 respectively.

The pivotal points of the rods 23 and 30 on the links, are so positioned relatively to the pivots of the arms 19, 20, 27 and 28 respectively, that as the shafts 10 and 11 rotate the links will be swung on the pivots of the arms, and the radial distances of blocks 24 relatively to the shafts 10 and 11 will be varied whereby the bell cranks 25, 26, 31 and 32 will be rocked.

The links 21 and 29 operate in a manner similar to the link motion of a locomotive in that the relative positions of the various links determine the condition of operation of the propeller shaft 5.

The levers 25, 26, 31 and 32 are all of the same length and are pivoted in horizontal alinement in the casing 14. The long arm of each lever has pivoted thereto a piston rod 33, 34, 35 and 36 respectively and the said rods carry double piston plungers 37, 38, 39 and 40 working in cylinders 41, 42, 43 and 44 respectively. The cylinders are arranged in pairs, 41 and 42 forming one pair, and 43 and 44 the other pair.

The cylinders are located in a housing 45 carried on the casing 14, and the housing together with those portions of the cylinders beyond the ends of the plungers are filled with a fluid, such as oil. The cylinders of each pair are adapted to be placed in communication with either of two compartments 46 and 47 in the housing by means of ducts 48 and 49 between the cylinders of one pair and ducts 50 and 51 between the cylinders of the other pair. The ducts communicate with the cylinders near the ends thereof and beyond the extremes of movement of the plungers.

In each duct is located a four-way valve 52, 53, 54 or 55 whereby either end of each cylinder may be placed in communication with either of the compartments 46 or 47. The valves are of the rotary type, and are of truncated conical form and are preferably spring pressed to prevent leakage. Each valve is provided with a pin 56 eccentrically positioned in one of its circular ends. The pin 56 of the valve 52 is positioned at 90° behind the position of the pin of valve 57, and the pins of the valves 54 and 55 are likewise positioned 90° apart. Each pin engages the slotted extremity of a lever 57 pivoted in the housing whereby when said levers are rocked the valves will be rotated. The opposite ends of the levers are bifurcated as at 58 and the forked ends of each cooperates with an enlargement on the spindle of a plunger 37, 38, 39 or 40 as the case may be. The valve 52 in the duct 48 which communicates with the cylinder 42 is operated by the plunger 37 in the cylinder 41. The valve 53 which governs the cylinder 41 is operated by the plunger 38 in the cylinder 42. Likewise the valves in the other pair of cylinders 43 and 44 by the plunger of its mate.

Each link arm 19, 20, 27 and 28 is individually connected by means of a pitman 59 to one arm of a bellcrank 60, 61, 62 or 63 pivoted in the casing 14. The bellcranks of each pair are linked together whereby said bellcranks are caused to move in unison. The bellcranks of one pair are opposed to those of the other pair whereby movements of the short arms of the pairs in the same direction will move the long arms of one pair in the direction opposite that of the movement of the long arms of the other pairs.

Rotatably mounted in the frame 14 and on a plane above the bellcranks is a shaft 64 provided with two radially projecting arms 65 and 66 arranged a short angular distance apart. The arm 66 is linked to the pair of bellcranks 62 and 63 so that when the shaft 64 is oscillated the said cranks will be pivoted.

To the end of the arm 65 a bellcrank lever 67 is pivoted at its center. One arm of the crank 67 is linked, by means of a universal joint, to the pair of bellcranks 60, 61 whereby when the shaft 64 is oscillated the said bellcranks will be rocked on their pivots. The other arm of the crank 67 is connected, by means of a universal joint, with a shift lever 68. The shift lever is pivoted to the shaft 64 in such a manner that it may be rocked in the direction of the axis of the shaft without affecting the latter, and which when rocked in the plane perpendicular to the axis will oscillate the said shaft.

Figure 17:
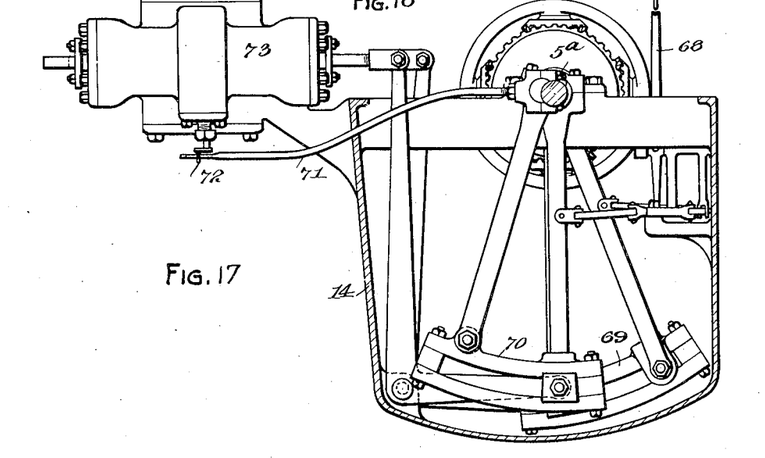
Fig. 17 is an end elevation similar to Fig. 2, but showing a modification in which the linkage system is connected directly to the main control gear shaft and the driven shaft.
Figure 18:
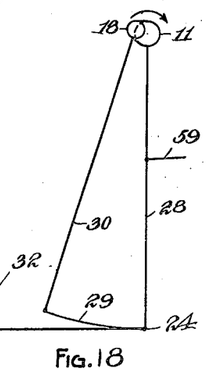
Figs. 18, 19, 20 and 21 are diagrammatic views illustrating, graphically, the positions of the counter shafts when the apparatus is running at full speed and the parts are in the position shown in Fig. 1.
Figure 19:
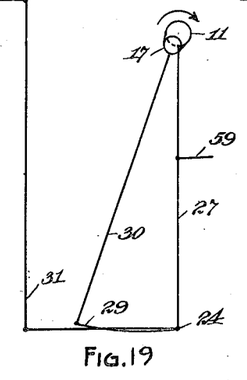
Figure 20:
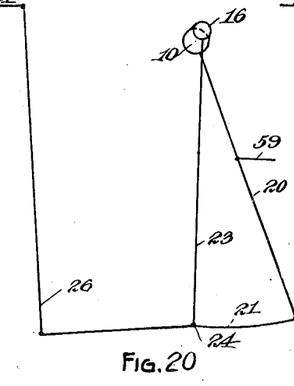
Figure 21:
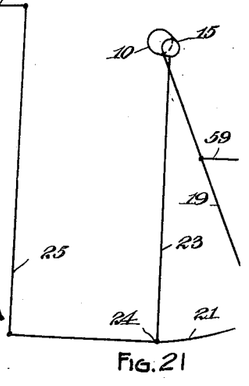
Figure 22:
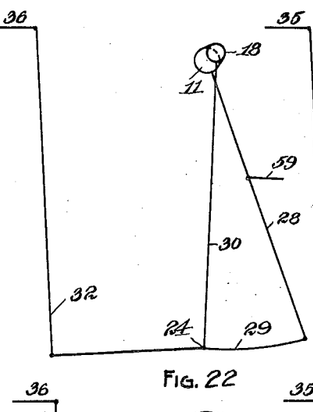
Figs. 22, 23, 24 and 25 are similar views showing the parts in the starting position.
Figure 23:
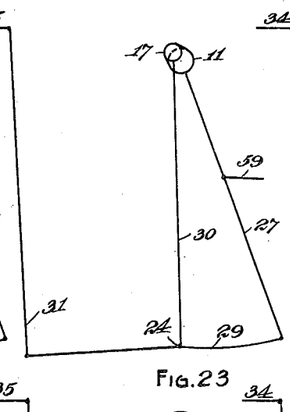
Figure 24:
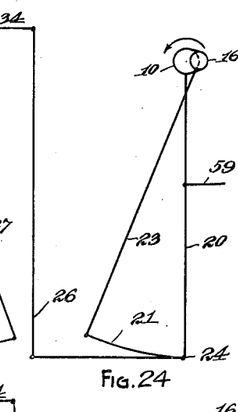
Figure 25:
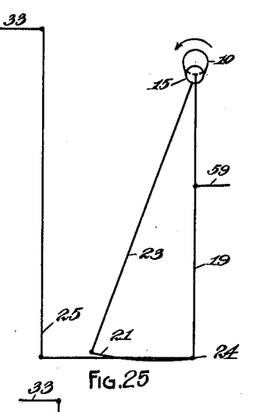

In the modification illustrated in Fig. 17 the countershafts are dispensed with and but two link systems 69 and 70, one swung on the propeller shaft 5ᵃ and one swung on a tubular shaft corresponding to 7, are employed in conjunction with a single pair of cylinders instead of two pairs as above described.

In this case the controlling shaft will, because of the proportions of the differential gearing, revolve at double the speed of the driven shaft, and the area of the cylinder connected up to the controlling shaft linkage must be half the area of the cylinder controlled by the linkage of the slower driven shaft. The rods of the links are swung one on an eccentric on the tubular shaft, and one on a crank in the shaft 5ᵃ and said eccentric and crank each carries an eccentric rod 71 which latter engages crank pins 72 on valves similar to 52, 53. The valves of the modification are provided with stems which extend outside of the housing 73 and which carry the crank pins.

The cylinders and plungers in the housing 73 may be duplicates of the pair of cylinders 41, 40, except as to area, and the shaft 5ᵃ may be driven by means of differential mechanism as above described, or by any other preferred differential gear, or by means of planetary gearing if desired.

If desired an auxiliary oil receptacle having gravity branches communicating with the compartments 46 and 47 of the housing 45 may be employed to replenish liquid which may leak out around the glands. A check valve may be provided in each branch to prevent the fluid from being forced out of the housing. One branch should communicate with each compartment 46 and 47 since while normally the chamber 47 is the suction chamber this condition will be reversed when the load on the gearing is reversed as when the car is held back by the engine on a down grade.

Figure 1:
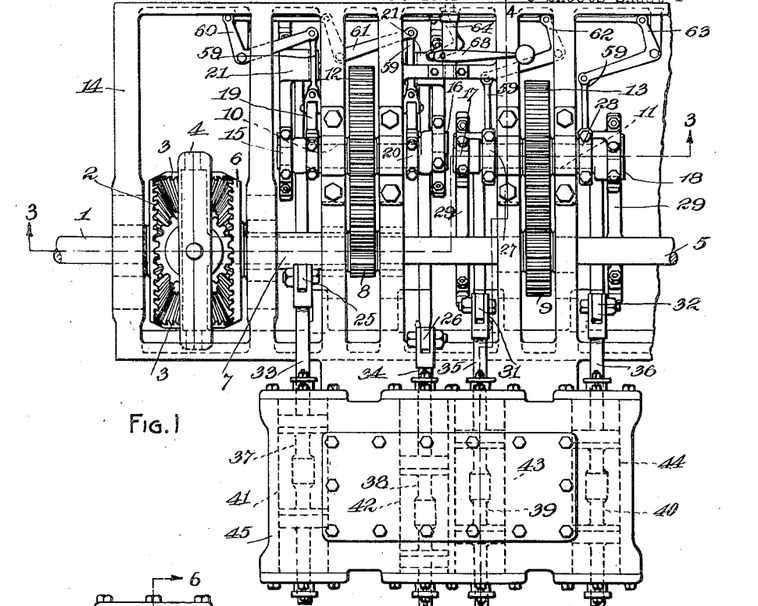
Fig. 1 is a top plan view of a device embodying the invention.
Figure 2:
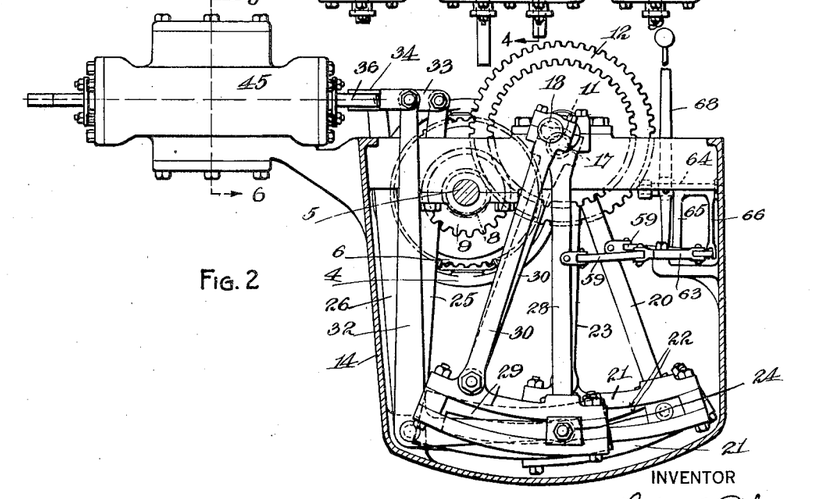
Fig. 2 is an end elevation, with the casing in section.
Figure 3:
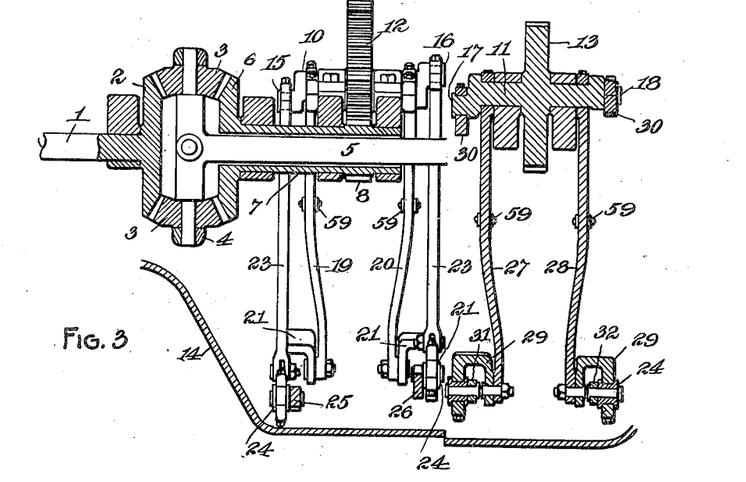
Fig. 3 is a section on the line 3—3 of Fig. 1.
Figure 4:
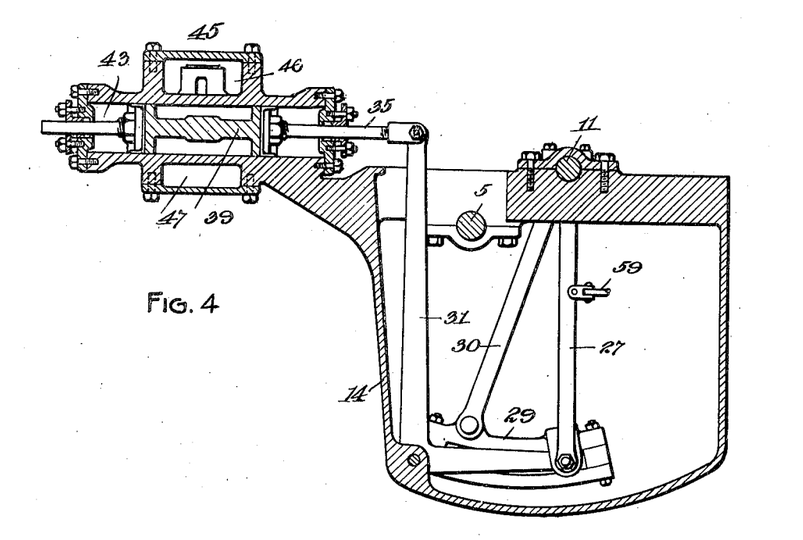
Fig. 4 is a section on the line 4—4 of Fig. 1.
Figure 5:
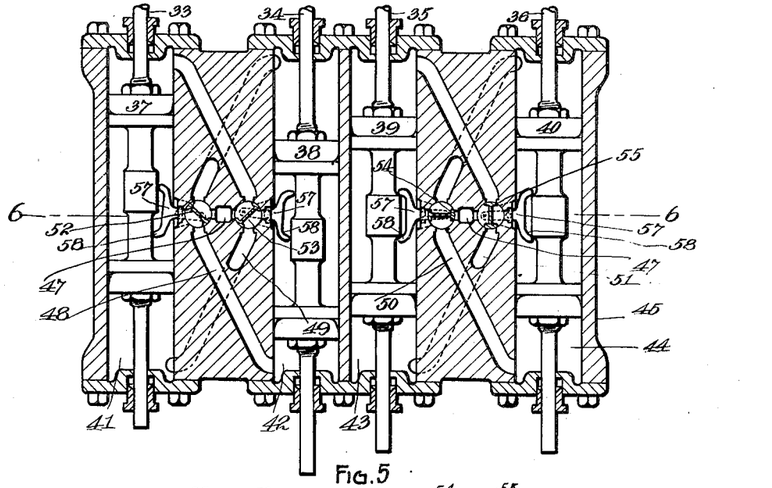
Fig. 5 is a section on an enlarged scale on the line 5—5 of Fig. 6.
Figure 7:
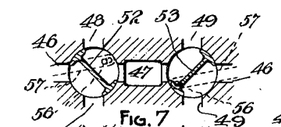
Figs. 7, 8, 9 and 10 are enlarged sectional views on the line 7—7 of Fig. 6 showing the complete cycle of the movements of two of the valves.
Figures 8, 9:
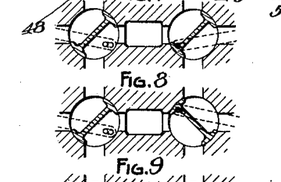
Figure 10:
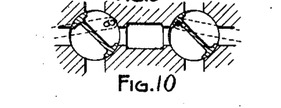
Figure 11:
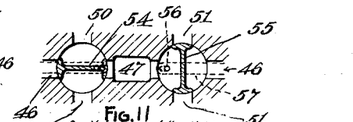
Figs. 11, 12, 13 and 14 are similar views showing the cycles of a second pair of valves.
Figures 12, 13:
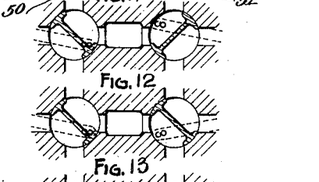
Figure 14:
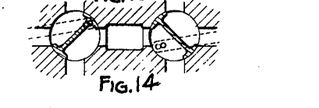
Figure 15:
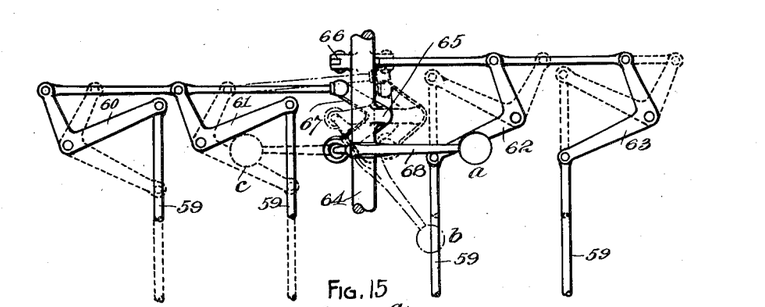
Fig. 15 is a diagrammatic top plan view of the control lever and its connections, showing three positions of the lever.
Figure 16:
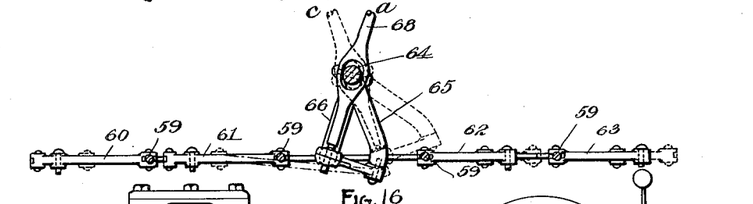
Fig. 16 is a side elevation of the same.

The operation is as follows:

The engine shaft 1 being in motion and the shift lever 68 being in the position shown in Fig. 1 and in the full line position at $a$ in Fig. 15, the links 21 and 29 will be in the positions shown in Figs. 18, 19, 20 and 21, the plungers 37, 38, 39 and 40 will be in the position shown in Fig. 5, and the valves, 52, 53, 54, and 55 will be positioned as shown in Figs. 5, 7 and 11 whereby the same ends of the cylinders 41 and 42 will be in communication with the compartment 47 of the housing 45, and the opposite ends of said cylinders will be in communication with the compartment 46. At the same time the plungers 39 and 40 will be held in the central positions by means of the links 29, the valves 54 and 55 will likewise be centered, there can be no circulation of fluid between the compartments 46 and 47, and hence there can be no movement of the plungers 37 and 38, and the counter shaft 10 and tubular shaft 7 will be held against rotation.

While the plungers 37 and 38 are held against reciprocatory movement as above described the shaft 11 is free to rotate since the movements of the eccentric arms 30 will simply rock the links 29 on the pivots at the lower ends of the arms 27 and 28. These pivots are in axial alinement with the pivots of the short arms of the bellcranks 31 and 32 on the blocks 24 carried in the slots of the links. During this idling movement of the shaft 11 the blocks 24 will be practically free of oscillation on their axes, and will not tend to move the bell cranks 31 and 32.

The liquid in the housing 45 can circulate in but one direction, that is from the compartment 47 past one side of each valve 52 and 53. Thence by ducts 48 and 49 to the receiving ends of the cylinders 41 and 42 (at the top in Fig. 5) and at the same time the liquid is being delivered from the opposite ends of the cylinders through the ducts and past the other sides of the valves 52 and 53 to the chamber 46.

Figure 6:
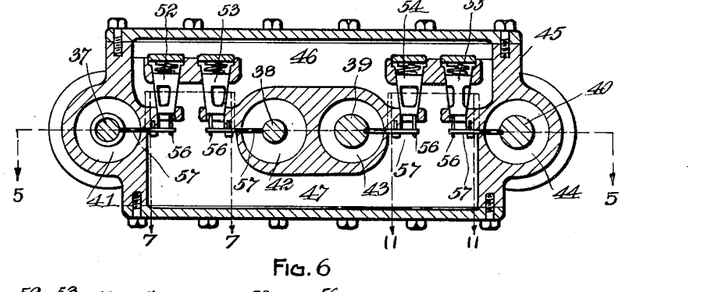
Fig. 6 is a section on an enlarged scale on the line 6—6 of Figs. 2 and 5.

From the chamber 46 the fluid will circulate past one side of each valve 54 and 55 and ducts 50 and 51 to whichever end of cylinders 43 or 44 is on the receiving side of the plunger in the cylinder, and at the same time liquid is being delivered from the opposite end of the cylinder, past the other side of the valve to the chamber 47 thus completing the circulation of the fluid. It is to be noted that the centered positions of the valve 54 and 55 in Figs. 5, 6 and 11 is incidental, as pistons 39 and 40 are positively held against movement by the positions of the bellcranks 31 and 32, and links 29 and their appurtenances.

As a result of this condition the gear 6 will be anchored and the pinions 3 will revolve around the axis of the shaft and at the same time rotate on their own axes, and the shaft 5 will be rotated in the same direction as the shaft 1 and at half the speed of the later. This will be full speed ahead of the device driven by the motor.

When the shift lever 68 is thrown forward to the dotted line position $c$ Fig. 15, the control links 21 and 29 are in the positions shown in Figs. 22, 23, 24 and 25, there will be no circulation of fluid since pistons 37 and 38 being held stationary will prevent movement of pistons 39 and 40 in cylinders 43 and 44, and consequently the countershaft 11 will be prevented from rotating, and the shaft 5 will be locked against rotation. The plungers 39 and 40 will be held in whatever position they may be in when the change is made, because of the closing of communication between the compartments 46 and 47 through the cylinders 43 and 44 the tubular shaft, gear 6 and countershaft 15 will be free to rotate, and the shaft 1 may be rotating, or at rest as desired, and the propeller shaft 5 will be locked against rotation.

When the shift lever is pivoted relatively to the shaft 64 as shown at $b$ Fig. 15, the plungers are all centered and the links are all set so that shafts 11 and 10, arms 23 and 30, and links 21 and 29 are all free to move without imparting motion to the bell cranks 25, 26, 31 and 32. This is the true neutral position of the device, and the car may coast with the engine running or not as desired.

When the shift lever is moved a short distance from $c$ toward $a$, the strokes of the plungers 37 and 38 will be short and rapid strokes owing to the positions of their links 29, and the plungers 39 and 40 will have long and slow strokes. As the shift lever approaches the vertical or mid-position the plungers 37 and 38 will have longer and less rapid strokes imparted to them, and the strokes of the plungers 39 and 40 will be shortened and more rapid until the mid position is reached when all of the plungers will move the same distance and at the same speed. As the shift lever is moved from the vertical position down toward the point $a$ Fig. 15 the plungers 37 and 38 will have still longer and less rapid strokes, while plungers 39 and 40 will have still shorter and more rapid strokes until when the position $a$ is reached the strokes of plungers 37 and 38 will be at maximum length and zero frequency, while the strokes of plungers 39 and 40 will be of zero length and maximum frequency. The revolutions of the shaft 5 will vary as the frequency of the strokes of the plungers 39 and 40. The movement of the shift lever at right angles to its path from $a$ to $c$ will rock the bellcrank lever 67 giving the bellcranks 60 and 61 a slightly greater movement than that imparted to them by the partial rotation of the shaft 64, and a greater movement than that imparted to the cranks 62 and 63.

The volume of fluid completing the circuits of the pairs of cylinders 37, 38 and 39, 40 will be zero when the shift lever 68 is in the position $a$ Fig. 15. The volume will gradually increase as the lever approaches the position midway between $a$ and $c$ reaching the maximum when the lever has covered half its path of travel, and gradually decreasing as the lever travels from the vertical down to the position $c$ when there will be no circulation of the fluid.

The apparatus will provide for an infinite number of speeds from zero to the greatest speed possible with the particular proportions of differential, or other gearing employed.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described what is claimed as new and desired to be secured by Letters Patent, is as follows:

1. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, and means for varying the speed of rotation of the shafts whereby relative rotation of the elements may be established.

2. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, and hydraulic means for varying the speed of rotation of the shafts whereby relative rotation of the elements may be established.

3. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a pivoted link carried by each shaft, a block slidable in each link, a plurality of cylinders, a plunger in each cylinder, and connections between each block and a plunger.

4. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a pivoted link carried by each shaft, a block slidable in each link, a plurality of cylinders, a plunger in each cylinder, connections between each block and a plunger, there being passages offering communication between the cylinders, and means for varying the areas of the passages.

5. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a pivoted link carried by each shaft, a block slidable in each link, a plurality of cylinders, a plunger in each cylinder, connections between each block and a plunger, there being passages offering communication between the cylinders, and means operated by the plungers for varying the areas of the passages.

6. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, an arm suspended from each shaft, a slotted link pivoted to each arm, and an eccentric on each shaft, a bar suspended on each eccentric, each of said bars being pivoted to a link at a point distant from the first mentioned pivot, means for swinging the arms whereby the positions of the links relatively to the shafts may be varied, a block slidable in each link, a plurality of cylinders corresponding in number to the links, a plunger in each cylinder, and connections between the blocks and the plungers.

7. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, an arm suspended from each shaft, a slotted link pivoted to each arm, an eccentric on each shaft, a bar suspended on each eccentric, each of said bars being pivoted to a link at a point distant from the first mentioned pivot, manually operated means for swinging the arms whereby the positions of the links relatively to the shafts may be varied, a block slidable in each link, a plurality of cylinders corresponding in number to the links, a plunger in each cylinder, and connections between the blocks and the plungers.

8. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a pair of spaced arms suspended on each shaft, an eccentric on each shaft in proximity to each arm, a link having a curved slot therein pivoted to the free end of each arm, a bar journalled on each eccentric, the free extremity of each bar being pivoted to a link, said latter pivot being eccentric to the other pivot of the link, a block slidable in each link, a plurality of cylinders in pairs, a plunger in each cylinder, and connections between each block and a cylinder whereby the plungers of each pair of cylinders will be operated by one of the shafts.

9. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other elements, a pair of spaced arms suspended on each shaft, an eccentric on each shaft in proximity to each arm, a link having a curved slot therein pivoted to the free end of each arm, a bar journalled on each eccentric, the free extremity of each bar being pivoted to a link, said latter pivot being eccentric to the other pivot of the link, a block slidable in each link, a plurality of cylinders in pairs, a plunger in each cylinder, connections between each block and a cylinder, whereby the plungers of each pair of cylinders will be operated by one of the shafts, there being a passage connecting the opposite ends of each cylinder of each pair, there being a pair of reservoirs common to all of the cylinders, there being passages between the reservoirs and the first mentioned passages, and valves in the passages whereby each reservoir may be placed in communication with either end of each cylinder and with each other.

10. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a pair of spaced arms suspended on each shaft, an eccentric on each shaft in proximity to each arm, a link having a curved slot therein pivoted to the free end of each arm, a bar journalled on each eccentric, the free extremity of each bar being pivoted to a link, said latter pivot being eccentric to the other pivot of the link, a block slidable in each link, a plurality of cylinders in pairs, a plunger in each cylinder, connections between each block and a cylinder whereby the plungers of each pair of cylinders will be operated by one of the shafts, there being a passage connecting the opposite ends of each cylinder of each pair, there being a pair of reservoirs common to all of the cylinders, there being passages between the reservoirs and the first mentioned passages, valves in the passages whereby each reservoir may be placed in communication with either end of each cylinder and with each other, and connections between each valve and a plunger.

11. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a pair of spaced arms suspended on each shaft, an eccentric on each shaft in proximity to each arm, a link having a curved slot therein pivoted to the free end of each arm, a bar journalled on each eccentric, the free extremity of each bar being pivoted to a link, said latter pivot being eccentric to the other pivot of the link, a block slidable in each link, a plurality of cylinders in pairs, a plunger in each cylinder, connections between each block and a cylinder whereby the plungers of each pair of cylinders will be operated by one of the shafts, there being a passage connecting the opposite ends of each cylinder of each pair, there being a pair of reservoirs common to all of the cylinders, there being passages between the reservoirs and the first mentioned passages, valves in the passages whereby each reservoir may be placed in communication with either end of each cylinder and with each other and connections between each valve and a plunger, the valve in the passage of one cylinder of a pair being connected with the plunger of the other cylinder of that pair.

12. Apparatus of the character described, comprising a member adapted to be rotated at approximately constant speed, a plurality of elements in axial alinement with the member and adapted to be rotated thereby, a shaft, connections between the shaft and one of the elements whereby said shaft may be rotated by the element, a second shaft, connections between said second shaft and another of the elements whereby said second shaft may be rotated by said other element, a linkage system suspended from each shaft, a plurality of cylinders, a plunger in each cylinder, connections between each linkage system and a plunger whereby the plungers may be reciprocated, and manually operated means for moving the linkage systems relatively to the axes of the shafts whereby the strokes of the plungers may be varied.

This specification signed and witnessed this seventeenth day of November, 1921.

LUCIAN H. BEEBE.

Witnesses:
MILDRED S. BEEBE,
JAMES R. MAY.